April 16, 1968  R. E. DICKINSON ET AL  3,378,420
PROCESS FOR MAKING WELL SCREEN
Filed Dec. 2, 1965

INVENTORS
Richard E. Dickinson &
Roger W. Dickinson

BY Spencer & Kaye

ATTORNEYS

United States Patent Office 3,378,420
Patented Apr. 16, 1968

3,378,420
PROCESS FOR MAKING WELL SCREEN
Richard E. Dickinson and Roger W. Dickinson, both of Rte. 2, Box 308, Theodore, Ala. 36582
Application May 1, 1964, Ser. No. 364,218, now Patent No. 3,221,819, dated Dec. 7, 1965, which is a continuation-in-part of application Ser. No. 265,550, Mar. 15, 1963. This application Dec. 2, 1965, Ser. No. 511,034
14 Claims. (Cl. 156—172)

ABSTRACT OF THE DISCLOSURE

A method of making a water well screen in which a plastic tube having longitudinally extending ribs projecting therefrom is chemically welded to a plastic screen element which has a generally wedge-shaped cross-sectional area by softening the surface of the ribs with a chemical welding agent, wrapping the screen element around the ribs, and holding the screen element in place until the softened ribs set to form a chemical weld. In the preferred embodiment, the plastic material is polyvinylchloride and the chemical welding agent is tetrahydrofuran.

---

This application is a continuation-in-part application of our co-pending application Ser. No. 364,218 now Patent No. 3,221,819, filed May 1, 1964, for Well Screen, which latter is a continuation-in-part of our application Ser. No. 265,550, filed Mar. 15, 1963, and now abandoned.

The present invention relates generally to well screens, and, more particularly, to a well screen which is substantially immune to clogging during insertion into the ground.

In the past, various types of well screens have been used for filtering fine particles out of liquid materials which are to be extracted from the ground. There is an extremely wide variety of such filters or screens which may be utilized. In all of these devices, however, attempts have constantly been made to prevent, as far as possible, clogging of the openings in the filter or screen, since this reduces the capacity or volume which may be extracted from the ground and thus impairs efficiency.

When such filters or screens become clogged to the extent that they hamper proper operation, it then becomes necessary to remove them from the ground and clean them or replace them and then insert them back into the ground. This removal and insertion back into the ground of the screen and the liquid conveying pipe is an expensive and time-consuming operation, and therefore, the prior art has sought to prevent clogging as much as possible.

One prior art screen invented by E. E. Johnson is disclosed in U.S. Patent No. 2,046,459. Briefly, this device includes a perforated pipe which is surrounded by wire which is helically wound thereabout, this wire having a cross section which is generally wedge-shaped. This construction provides what may be termed a self-cleaning feature in that a V-shaped slot is formed between coils and the wider portion of this slot faces the interior of the tube. Thus, any foreign particles which are sufficiently small to pass through the smaller section of this slot will pass fully through the slot and will not be bound or caught therein since the slot widens inwardly. In this respect it must be noted that many of the particles and granules are not perfectly round but are of odd shapes, and if the slots were of constant width, the tumbling or turning action which these particles undergo would cause at least some of them to become bound or engaged within the slots. However, the expanding V-design prevents this and, therefore, this type of screen is self-cleaning and to a large extent reduces clogging during extraction of liquid from the ground.

However, the capacity of liquid flow through such a screen as well as other prior art screens when inserted into the ground, is somewhat disappointing since it has been found that the capacity is not as high as is expected from a screen of this type of construction. Such expected capacity is found both by calculation and above the ground testing. This problem of the difference in expected and actual capacity has persisted for quite some time.

After much testing and experimentation, we have determined that the reason for the inconsistency in the capacity of flow which is expected and that which is actually obtained is due to clogging of the screen during the time it is being inserted into the ground, and thus upon initial operation the screen is already at least partially clogged. This thus accounts for the difference between the expected capacity through the screen and the capacity which is provided after insertion into the ground.

Further analysis revealed that the outer surface of the screen was so arranged that upon engagement of the outer surface with the interior of an opening drilled into the ground, dirt and grit and granules and the like will clog the openings of the filter because of the nature of these outer surfaces. It should be noted that even though an opening drilled in the ground is considerably larger in diameter than the pipe or screen which is to be inserted into the ground, it is practically impossible to insert such a tube into the ground without it contacting the interior walls of the opening and thus providing clogging of these portions of the filter which do contact the ground.

Also, in well screens of the type wound with wire there are a great many difficulties involved in attaching the wire in a neat, uniform and strong manner so that it will, in its final form, be free of external projections. Such screens in the past have been subject to rust, rot and electrolysis.

With these defects of the prior art in mind, it is a main object of this invention to provide for the production of a well screen which has a greater capacity of flow therethrough than the prior art.

Another object of this invention is to provide for the production of a well screen which has a capacity of flow therethrough when inserted into the ground which is substantially the same as that which is provided before insertion into the ground.

A further object of the present invention is to provide for the production of a device of the character described which will not become clogged during its insertion into the ground.

Still another object is to provide a construction wherein the wire is very firmly attached in place.

Still a further object is to provide a construction wherein the gauge or slot is uniform.

Yet another object is to provide for the production of a screen which in toto is rustproof, rotproof, and electrolysis-proof.

These objects and others ancillary thereto are accomplished according to preferred embodiments of the invention wherein a perforated tube is formed having outwardly extending ribs and a band which is wound about the ribs in helical fashion and attached in place.

The band is generally wedged-shaped in cross section and the outer surface of the band has sharp opposite edges between which the surface is convex.

Additional objects and advantages of the present invention will become apparent upon consideration of the following description when taken in conjunction with the accompanying drawings in which.

Since we had determined that known well screens are partially clogged after they have been installed, we delved further into this aspect of the problem and found that this is due to the fact that the flat type of wire covering is used and when lowering this into a drilled hole, which is usually lined with fine sands and clay and possibly drilling mud which is of the consistency of dairy cream, it is impossible to center and set in place 30 to 150 feet of pipe without touching the walls of the holes.

The present invention thus provides for convex surfaces on the band which is wrapped around the tube to form the screen so that the outer surface of the screen is undulated. The manner in which the present invention provides this beneficial feature will now be explained. In the process of smoothing rough cement which has just been poured, one stroke with a trowel edge raised above the surface and moved in the direction of travel will level the high spots of the cement. Now, if this same trowel is provided with a series of slots disposed at a 90° angle from the intended stroke, and this trowel is then used to smooth cement, the fine sand and cement will immediately clog the slots of the trowel. In a similar manner, certain well screens of the prior art were similar to the hypothetical slotted trowel and therefore become clogged when inserted into the ground.

The present invention is provided with a rounded or convex surface which eliminates the clogging process since each coil surface acts as its own little narrow trowel when the screen is installed. Thus, the slots in the screen are substantially free of sands and fine clays after the screen is installed. The reason for this is that the rounded or convex surface tends to smooth the fine sands so that they will not enter the narrow portions of the slots. However, wire having a fully rounded cross section is not suitable either, for particles may still, to some extent at least, move along the rounded surface and enter the slots. But, with the present invention, any fine grains or particles which do roll along the convex surface and move towards the slots will be generally prevented from entering the slots due to the opposite sharp edges on each side of the slots which tend to be discriminating and which, during movement with respect to the sands, tend to prevent the engagement of particles in the slots, and they therefore move on to the next coil and move along the convex surface thereof. In this manner, particles are prevented from clogging the slots during insertion of the pipe into the ground.

With more particular reference to the drawings, the figures illustrate a tube 10 which is surrounded by a screen or filter element 12.

Figure 1:
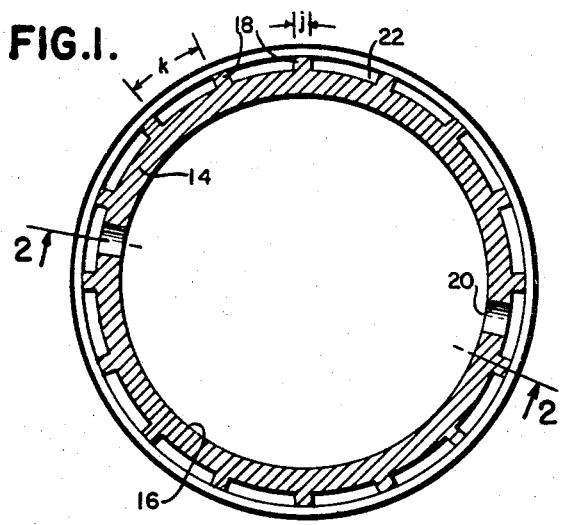
FIGURE 1 is a horizontal sectional view through a section of a well screen comprising the present invention.

The tube is constructed of a cylindrical member or body portion 14 having a hollow interior 16 for carrying the liquid to the discharge pipe so that such liquid may be raised to ground level. A plurality of longitudinally extending, parallel, and circumferentially spaced ribs or underbars 18 are provided on the outer surface of cylinder 14. If desired, these ribs 18 may taper slightly outwardly when viewed in cross section as illustrated in FIGURE 1. The entire tube, that is the cylinder 14 as well as ribs 18, is constructed of polyvinylchloride.

This polyvinylchloride is made by an extrusion process by forcing the synthetic, while heated, through a die similar to a pipe die. If it is desired that the ribs be formed at the same time, then the die is machined accordingly.

Furthermore, a plurality of openings 20 are formed through the wall of cylinder 14 and at portions thereof disposed between adjacent ribs 18. These openings 20 extend through the pipe for the entire length thereof so that chambers 22 which are formed between the adjacent ribs and the outer surface of cylinder 14 are in communication with the interior 16 of the cylinder.

Figure 3:
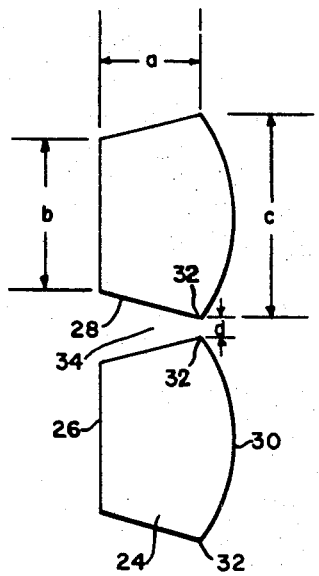
FIGURE 3 is a diagrammatic view showing two adjacent loops of the screen.

The screen or filtering means 12 is formed of a long strip or band of relatively thin material which is wound about the tube 10 so as to be engaged upon the outer surfaces of the ribs 18. One type of strip 24 which is shown in detail in FIGURE 3, is generally wedge-shaped in cross section and thus has a flat inner surface 26 which engages the outer surfaces of ribs 18, inclined side surfaces 28 to define the wedge, and an outer convex surface 30. The opposite edges 32 of convex surface 30 are relatively sharp.

The strip 24 is coiled about the tube 10 and engages the ribs 18 in such a manner that there is a slight and substantially uniform spacing between the facing sharp edges 32 of adjacent coils. This forms V-shaped slots 34 between adjacent coils and such slots expand inwardly. Furthermore, the coiling of strip material 24 about the tube tends to partially enclose the otherwise open side of chambers 22.

The strip 24 which defines the screen coil is also constructed of polyvinylchloride. This plastic screen wire is chemically welded or bonded onto the ribs and this has been accomplished in a particularly beneficial manner by using a chemical bonding material of tetrahydrofuran and a filler of GEON 103 EP made by the B. F. Goodrich Chemical Company and which is closely related to polyvinylchloride. GEON 103 EP is mixed with the tetrahydrofuran using 15% by volume of the former. The viscosity of the material can be adjusted to the desires and exigencies of the situation by using a solvent such as methylethylketone. This chemical mixture is then placed into a vat and the tube 10 placed onto a rotating wheel which is partially submerged in the chemicals in the vat, thereby picking up sufficient chemicals so that the outer surfaces of the ribs 18 have this liquid applied thereto. Furthermore, at the same time, the strip material 24 is tensioned and wound about the tube 10 in such a manner that spaces are provided between the sharp edges 32 which spaces or slots are substantially uniform about the entire tube. Within three to five seconds the screen is welded to the tube. The chemical welding agent is applied to the ribs or underbars two or three rounds or turns prior to the application of the plastic wire.

Figure 4:
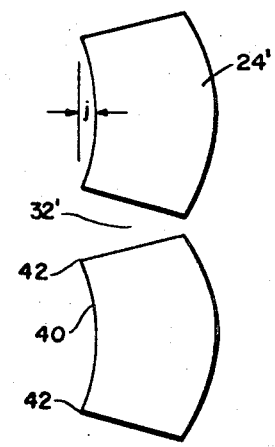
FIGURE 4 is a view similar to FIGURE 3 showing another type of screen wire.
Figure 5:
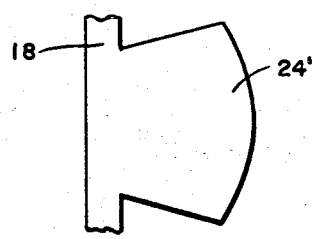
FIGURE 5 is a diagrammatic view showing the connection of the wire of FIGURE 4 to a rib.

Another type of wire 24' of similar construction to wire 24 is shown in more detail in FIGURES 4 and 5. This wire too is coiled about tube 10 and is wrapped over the ribs 18 in a manner which provides a slight albeit uniform spacing between the facing sharp edges 32' of adjacent turns or coils. However, instead of the flat inner surface 26, a concave inner surface 40 is provided and is vital in keeping the gauge or slot uniform. This curve actually serves a three-fold purpose.

First, it cradles the liquid tetrahydrofuran which is placed onto the wire about one second before the wire comes into contact with ribs 18. This process uses the same technique with the wheel being partially submerged in a vat of tetrahydrofuran. However, this wheel is very narrow, e.g., 1/32 inch, so that the chemical will be deposited only in the concave surface.

Second, since the bottom corners 42 extend outwardly furthermost and make first contact with the ribs 18, and since the tetrahydrofuran has a softening tendency on the polyvinylchloride, the tetrahydrofuran is placed in the center of the groove, allowing the edges or corners to remain dry. The tetrahydrofuran has been placed on ribs 18 about four to five seconds before and since it has softened the ribs 18 when contact is made with sharp corners 42, they sink into the softened rib 18 to a depth of about .003 inch. Surprisingly, although this may not seem like much, it is sufficient to prevent the wire from sliding out of place. A spacer for different size slots is placed where the strip or wire first makes contact with the ribs, one side being against the previous round of wire.

Third, after the above constructional method is performed, a screen is provided with the spiral wrapping of wire completed and without projections which previously in this art had been formed. This important reason for avoiding these projections is set forth in detail above.

The process described above provides what may be thought of as "chemical welding." During the first 10 to 12 seconds after the tetrahydrofuran and 103 EP are applied to a surface of polyvinylchloride, it has an oily or greasy appearance. Two pieces placed together will slip and slide as if they were greasy. After a period of about 10 to 12 seconds, the surfaces begin to become tacky or sticky like glue. Within five to eight minutes the joint is firm, considering the temperature and humidity. One reason for the rapid set-up time is the high rate of evaporation and penetration which is aided by mixing two parts of commercial ether with the tetrahydrofuran.

The chemical welding provides a connection of the elements of very great strength. The attachment can not properly be considered a glued one. It is rather a strong weld provided chemically.

Since the entire screen is made of polyvinylchloride, it is rust-proof, rot-proof, and electrolysis-proof. "Electrolysis" of, for example, metal well screens or screens used in combination with metal, become corroded and clogged with crustation while in the ground. This can occur even with an all stainless steel well screen. Although the present invention contemplates the use of polyvinylchloride, other materials possessing the desired characteristics may be used. Preferably such materials should bend before they break and be capable of being used to form a very firm bond.

Furthermore, although our preferred embodiment is constructed by forming the ribs simultaneously with the tube, as mentioned above, it is nevertheless possible to form the ribs and the tube separately.

The screen thus formed is utilized in a manner which is well known and therefore need not be described in detail. However, it should be noted that the V-shaped slots 34 which are provided aid in filtering out impurities which are found in ground water. The V-nature of the slots allows impurities which pass through the narrower sides of the slots to pass all the way therethrough since the impurities turn and tumble and if the slots were of uniform dimensions then turning impurities could become lodged against the sides of the slots since such impurities may be larger in one dimension than in another. However, with the inwardly expanding slot this is obviated to a great extent. The widths of the slots of different screens differ depending upon location and the type of ground into which the well is to be formed. In some locations a 0.002 inch slot can be used while in other locations a 0.010 or 0.012 inch slot may be used and the size of the slot depends on the size of the grains of sand or gravel into which the pipe is to be embedded.

The wedge-shape is not only needed to provide the V-slot but also because of the sharp edges which are thereby formed since these are needed and accordingly a circular cross section wire would not be suitable for the purpose. If a round cross section wire were to be used, there would be slow progression of the curve toward the slot and there would be round surfaces coming together where the two circles are closest together and thus no abrupt corner would be formed. A salient feature of the present invention is the abrupt corners since they assure successful operation of the device by providing a cleaning or filtering element which does not clog. On the other hand, if circular wire is used, the edges are round so that dirt can slide between the two during installation of the pipe since the discrimination against clogging particles entering the slot which is provided by the abrupt corners by the present invention will not be provided when round wires are used and during insertion into the ground sand and gravel and the like can pass through the slots and clog it.

The present invention thus prevents clogging of the slots during the insertion into the ground. However, wedge-shaped wires having flat outer surfaces will become clogged as the surfaces move against the ground downwardly into their proper position and they will become clogged in a similar manner as the hypothetical slotted trowel, mentioned above. Accordingly, the convex surfaces of the present invention provide for proper insertion of the pipe into the ground and it has been found that such pipe when inserted into the ground provides a greater capacity than previously and does not become clogged during insertion and before operation thereof.

Figure 2:
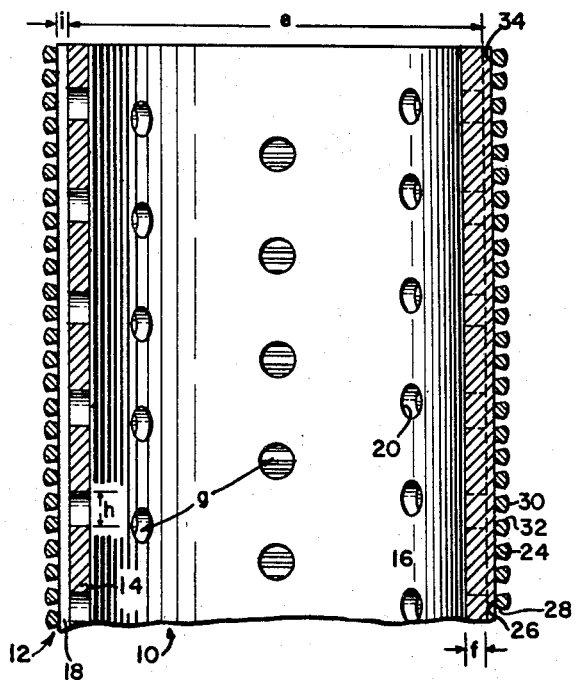
FIGURE 2 is a vertical sectional view taken substantially along the plane defined by reference line 2—2 of FIGURE 1 and illustrating other details of the invention.

FIGURES 1 to 3 of the drawings indicate various dimensions $a$ through $k$ and in one practical embodiment of the invention which has been constructed, these dimensions, mostly to the nearest $\frac{1}{32}$ in. are as follows:

$a = \frac{2}{32}$ in.
$b = \frac{3}{32}$ in.
$c = \frac{4}{32}$ in.
$d = 0.002$–$0.012$ in.
$e = \frac{25}{32}$ in.
$f = \frac{3}{32}$ in.
$g = \frac{17}{32}$–$\frac{23}{32}$ in.
$h = \frac{7}{32}$ in.
$i = \frac{2}{32}$ in.
$j = \frac{3}{32}$ in. at small end of taper and $\frac{7}{64}$ at wide end
$k = \frac{10}{32}$ in.

In this embodiment the tube and screen are polyvinylchloride.

In a practical embodiment of the form shown in FIGURES 4 and 5, the dimensions were generally similar and $j$ was approximately .005 in.

It should be noted that no portions of the turns of wire 24 or 24' are in contact with each other. Thus the slot between adjacent turns is uniform and uninterrupted. In one prior art arrangement the wire sides are provided with projections which abut against the adjacent turn. However, those projections create a loss of over 13 percent of slot space and thus decrease water flow through the screen despite the fact that the slot is the most important part of any screen.

This at least in part explains why, in actual operation, the well screen of the present invention delivers more gallons per minute for a particular size and at a particular price, than any other well screen on the market today.

It will be understood that the above description of the present invention is susceptible to various modifications, changes and adaptations, and the same are intended to be comprehended within the meaning and range of equivalents of the appended claims.

What is claimed is:

1. A method of attaching a relatively large base element made of a synthetic resinous material to a smaller element made of a synthetic resinous material having a lower surface which includes at least one sharp projecting edge comprising the steps of:
   applying a chemical welding agent to a portion of the surface of the base element to soften said surface portion thereof;
   placing the smaller element on the base element while the latter is in the softened condition so that the sharp projecting edge sinks into the base element; and
   accurately maintaining the smaller element in position while allowing the softened surface to dry and set to form a chemical weld between the base and smaller elements.

2. A method of making a water well screen, comprising the steps of:
   providing a tube of synthetic resinous material having longitudinally extending ribs projecting therefrom and a plurality of openings formed through the wall thereof;

providing a screen wire which is generally wedge-shaped in cross section and including outer and inner surfaces joined by inclined side walls with the inner surfaces being concave and having sharp opposite edges;

applying a chemical welding agent to the outer surfaces of the ribs to soften them;

wrapping the wire about the ribs while the outer surfaces thereof are in the softened condition so that the inner surface of the wire engages about the ribs and the sharp edges of said inner surface sinks into the ribs; and holding the screen wire accurately in position while the outer surface of the ribs hardens to form a chemical weld between the ribs and screen wire.

3. A method as defined in claim 2 wherein said tube, ribs, and wire are made of a synthetic resinous material.

4. A method as defined in claim 3 wherein said synthetic resinous material is polyvinylchloride.

5. In a method of making a water well screen, the improvement comprising the steps of:
   (a) providing a screen wire of synthetic resinous material which is generally wedge-shaped in cross section and has relatively sharp opposite edges along its inner and outer surfaces with the inner surfaces being concave;
   (b) providing a tube of synthetic resinous material having longitudinally extending ribs projecting therefrom;
   (c) applying a chemical welding agent onto at least portions of the outer surfaces of said ribs to soften the surfaces of the ribs;
   (d) applying a chemical welding agent onto the inner concave surface of said wire;
   (e) wrapping the wire about the ribs, while its surfaces are in a softened condition, so that the inner surfaces of the wire engage about the ribs and the sharp edges of the lower surfaces sink into the ribs in such manner as to form a continuous and uniform slot which is generally V-shaped with its wider portion facing inwardly; and
   (f) holding the wire accurately in position while the ribs and wire harden and form a chemical weld.

6. A method as defined in claim 5 wherein the welding agent is applied to the ribs by placing the welding agent into a vat, rotating a wheel which is partially submerged in the agent in the vat, and placing the tube onto said wheel so that the wheel picks up agent from the vat and deposits it onto the ribs of the tube.

7. A method as defined in claim 6 wherein the wire is tensioned and wrapped about the ribs helically and the welding agent is applied to the ribs two or three turns prior to the application of the wire.

8. A method as defined in claim 7 comprising applying chemical welding agent to the concave portion of the inner surface of the wire before it comes into contact with the ribs.

9. A method as defined in claim 8 wherein the synthetic material is polyvinylchloride.

10. A method as defined in claim 9 wherein the chemical welding agent is tetrahydrofuran.

11. A method as defined in claim 10 wherein the tetrahydrofuran is applied to the concave portion of the inner surface of the wire approximately one second before the wire comes into contact with the ribs.

12. A method as defined in claim 10 wherein the tetrahydrofuran is applied to the outer surfaces of the ribs approximately 4–5 seconds before the wire comes into contact with the ribs.

13. A method as defined is claim 12 wherein a commerical ether is mixed with the tetrahydrofuran in the ratio 2:1 before the tetrahydrofuran is applied to said surfaces.

14. A method of making a water well screen, comprising the steps of:
   providing a tube of polyvinylchloride having longitudinally extending ribs projecting therefrom and a plurality of openings formed through the wall thereof;
   providing a screen wire of polyvinylchloride which is generally wedge-shaped in cross section and including outer and inner surfaces joined by inclined side walls with the inner surfaces being concave and having sharp opposite edges;
   applying tetrahydrofuran to the outer surfaces of the ribs to soften them;
   wrapping the wire about the ribs while the outer surfaces thereof are in the softened condition so that the inner surface of the wire engages about the ribs and the sharp edges of the inner surface sinks into the ribs; and
   holding the screen wire in position while the outer surface of the ribs hardens to form a chemical weld between the ribs and the screen wire.

References Cited
UNITED STATES PATENTS

| | | | |
|---|---|---|---|
| 1,008,029 | 11/1911 | Gorman | 264—249 |
| 1,739,246 | 2/1929 | Majce | 156—303.1 |
| 2,046,461 | 7/1936 | Johnson | 209—393 |
| 3,041,915 | 7/1962 | Ryffel | 161—177 |
| 3,219,742 | 11/1965 | Reinert | 264—248 |
| 2,458,032 | 1/1942 | Simon et al. | 154—140 |

EARL M. BERGERT, *Primary Examiner.*

J. P. MELOCHE, D. J. FRITSCH, *Assistant Examiners.*